(12) United States Patent
Guo

(10) Patent No.: US 11,712,656 B2
(45) Date of Patent: Aug. 1, 2023

(54) DRYING AND FILTERING DEVICE

(71) Applicant: SHENZHEN BITEMAN TECHNOLOGY CO., LTD., Shenzhen (CN)

(72) Inventor: Ying Hui Guo, Shenzhen (CN)

(73) Assignee: Shenzhen Biteman Technology Co., Ltd., Shenzhen (CN)

( * ) Notice: Subject to any disclaimer, the term of this patent is extended or adjusted under 35 U.S.C. 154(b) by 476 days.

(21) Appl. No.: 15/733,647

(22) PCT Filed: Jun. 28, 2019

(86) PCT No.: PCT/CN2019/093757
§ 371 (c)(1),
(2) Date: Sep. 24, 2020

(87) PCT Pub. No.: WO2020/062992
PCT Pub. Date: Apr. 2, 2020

(65) Prior Publication Data
US 2021/0008492 A1  Jan. 14, 2021

(30) Foreign Application Priority Data
Sep. 30, 2018  (CN) .......................... 201811159274.X

(51) Int. Cl.
*B01D 53/26* (2006.01)
*B01D 53/04* (2006.01)
(Continued)

(52) U.S. Cl.
CPC ....... *B01D 53/265* (2013.01); *B01D 53/0407* (2013.01); *B01D 53/0431* (2013.01);
(Continued)

(58) Field of Classification Search
CPC ................ B01D 53/04; B01D 53/0407; B01D 53/0431; B01D 53/0438; B01D 53/0446;
(Continued)

(56) References Cited

U.S. PATENT DOCUMENTS

| 5,927,084 A | * | 7/1999 | Fielding | ................ F24F 5/0085 62/96 |
| 2003/0015093 A1 | * | 1/2003 | Wegeng | .................... C01B 3/56 95/114 |
| 2017/0074528 A1 | * | 3/2017 | De Piero | .............. B01D 53/265 |

FOREIGN PATENT DOCUMENTS

WO    WO-2013102344 A1 * 7/2013 ......... B01D 53/0438

* cited by examiner

*Primary Examiner* — Frank M Lawrence, Jr.
(74) *Attorney, Agent, or Firm* — Rosenberg, Klein & Lee

(57) ABSTRACT

A drying and filtering device. The filtering and drying device comprises a bearing base body, an adsorption drying tube and a refrigerating tube. The bearing base body comprises an upper adsorption airflow cavity and an upper refrigerating airflow cavity located at an upper end of the bearing base body, and a lower adsorption airflow cavity and a lower refrigerating airflow cavity located at a lower end of the bearing base body. The adsorption drying tube is vertically arranged between the upper end and the lower end, and communicates with the upper adsorption airflow cavity and the lower adsorption airflow cavity. The refrigerating tube is vertically arranged between the upper end and the lower end, and communicates with the upper refrigerating airflow cavity and the lower refrigerating airflow cavity. The bearing base body further comprises an air intake guide cavity, and communicates with the refrigerating tube and the adsorption drying tube.

20 Claims, 7 Drawing Sheets

(51) Int. Cl.
  *F28F 1/36* (2006.01)
  *F28D 21/00* (2006.01)
(52) U.S. Cl.
  CPC ..... *B01D 53/0438* (2013.01); *B01D 53/0446* (2013.01); *B01D 53/261* (2013.01); *F28F 1/36* (2013.01); *F28D 2021/0038* (2013.01)
(58) Field of Classification Search
  CPC ................ B01D 53/261; B01D 53/265; F28D 2021/0038; F28F 1/36
  USPC ...... 96/108, 121, 126, 133, 134; 34/80, 472, 34/473
  See application file for complete search history.

DRYING AND FILTERING DEVICE

CROSS-REFERENCE TO RELATED APPLICATIONS

This application is the 371 application of International Application No. PCT/CN2019/093757, filed on Jun. 28, 2019, which is based upon and claims priority to Chinese Patent Application CN201811159274.X, filed on Sep. 30, 2018, the entire contents of which are incorporated herein by reference.

TECHNICAL FIELD

The present disclosure relates to the field of air purification, in particular to a drying and filtering device.

BACKGROUND

Compressed air is an important power source in industrial manufacturing. Compressed air contains a lot of moisture. At present, moisture in compressed air is mainly removed by adsorption dryers and freeze dryers.

The freeze dryer mainly makes the compressed air from high temperature turn to low temperature, the saturated steam condenses into liquid water, and the water separated by the gas-water separator is discharged through the drain valve. In order to prevent from freezing and causing pipeline blockage, the drying dew point temperature (the dew point temperature refers to the temperature at which the air is cooled to saturation without changing the water vapor content and air pressure) of the freeze dryer is usually above zero, so it cannot be completely solve the problem of moisture in compressed air.

The adsorption dryer can fully dry the compressed air based on the principle of adsorbing moisture at low temperature and separating and regenerating at high temperature and low pressure. However, the pre-freeze dryer is required to cool the compressed air, and the pre-freeze dryer is usually arranged on the pipeline path at the front of the adsorption dryer, and covers a large area.

Therefore, how to completely remove the moisture in the compressed air and reduce the volume of the entire dryer has become a problem to be solved in the industry.

SUMMARY

There are provided a drying and filtering device according to embodiments of the present disclosure. The technical solution is as below:

The present disclosure provides a drying and filtering device, including:
  a bearing base comprising an upper adsorbing airflow chamber and an upper refrigerating airflow chamber located at the upper end of the bearing base and a lower adsorbing airflow chamber and a lower refrigerating airflow chamber located at the lower end of the bearing base;
  adsorption drying tubes vertically arranged between the upper end and the lower end of the bearing base, and communicated with the upper adsorbing airflow chamber and the lower adsorbing airflow chamber;
  a refrigerating tube vertically arranged between the upper end and the lower end of the bearing seat, and communicated with the upper refrigerating airflow chamber and the lower refrigerating airflow chamber; and the bearing seat body further comprising an intake guiding chamber, which is communicated with the refrigerating tube and the adsorption drying tubes, so that the airflow refrigerated by the refrigerating tube can enter the adsorption drying tube through the intake guiding chamber for drying.

It should be understood that the foregoing general description and the following detailed description are exemplary and explanatory only and cannot limit the present disclosure.

BRIEF DESCRIPTION OF THE DRAWINGS

The drawings herein are incorporated into the specification and form a part of the specification, showing embodiments in accordance with the present invention, and are used together with the specification to explain the principles of the invention.

DETAILED DESCRIPTION

In order to further illustrate the principle and structure of the present invention, the preferred embodiments of the present invention will be described in detail with reference to the accompanying drawings.

Figure 1:
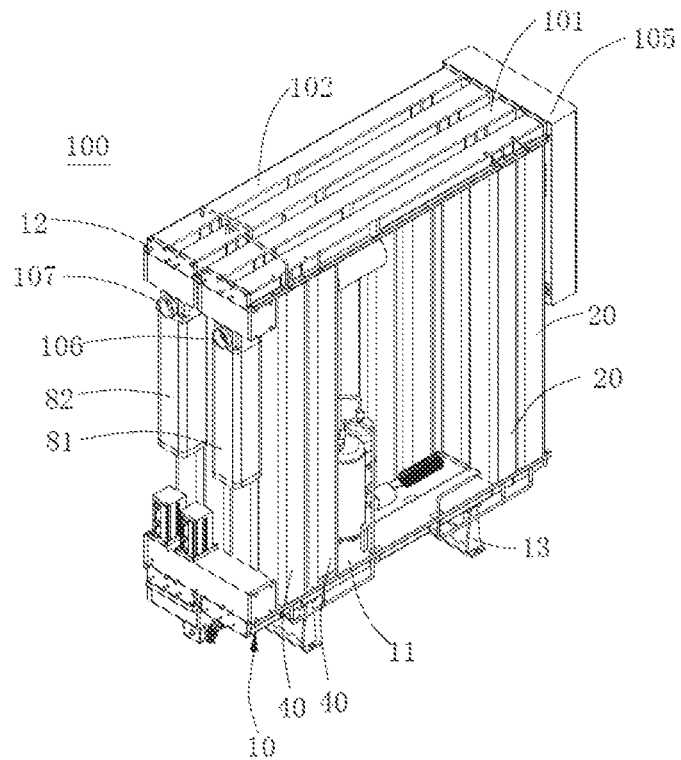
FIG. 1 is a schematic perspective view of the drying and filtering device of the present disclosure rotated at an angle in an embodiment.
Figure 2:
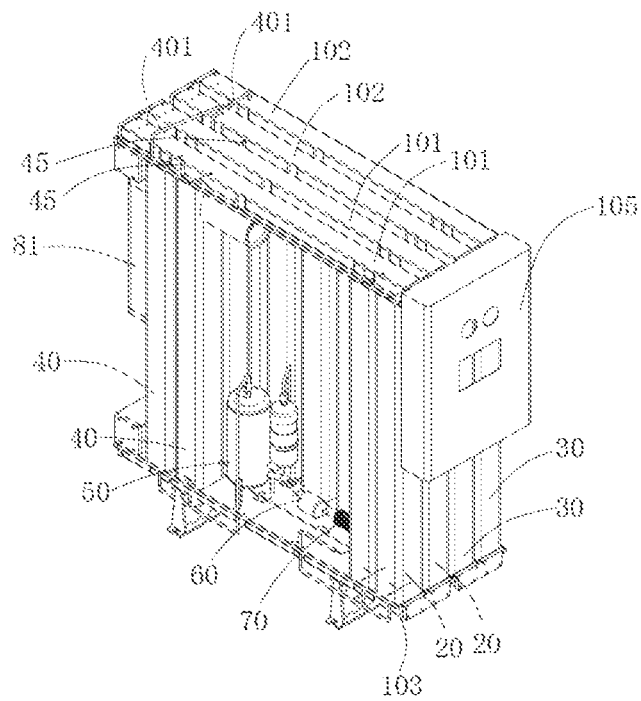
FIG. 2 is a schematic perspective view of the drying and filtering device of the present disclosure rotated at another angle in an embodiment.
Figure 3:
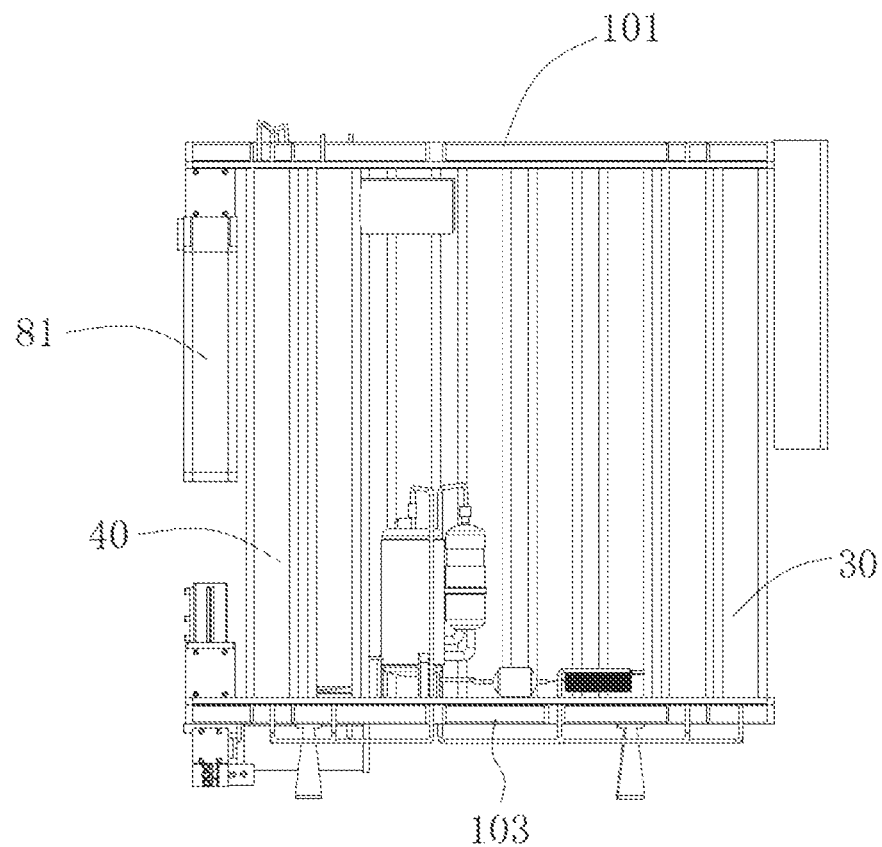
FIG. 3 is a structure view, seen as from the front side, of the drying and filtering device of the present disclosure in an embodiment.
Figure 4:
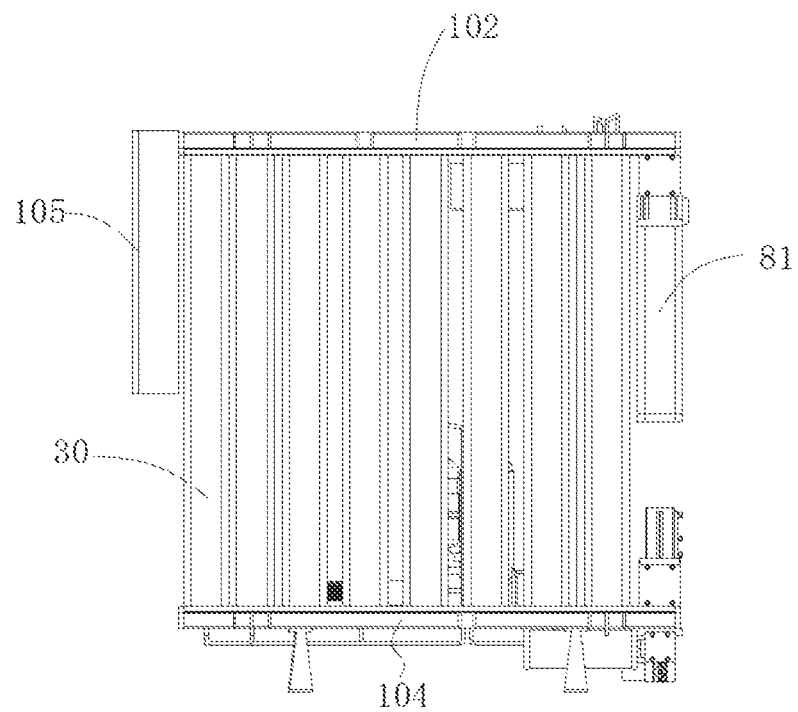
FIG. 4 is a structural view, seen as from the back side, of the drying and filtering device of the present disclosure in an embodiment.
Figure 5:
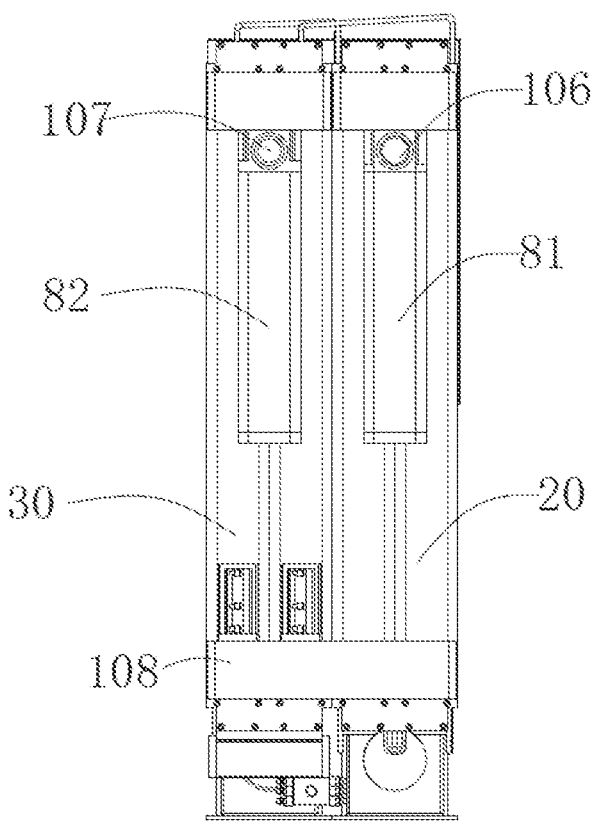
FIG. 5 is a structural view, seen as from the left side, of the drying and filtering device of the present disclosure in an embodiment.
Figure 6:
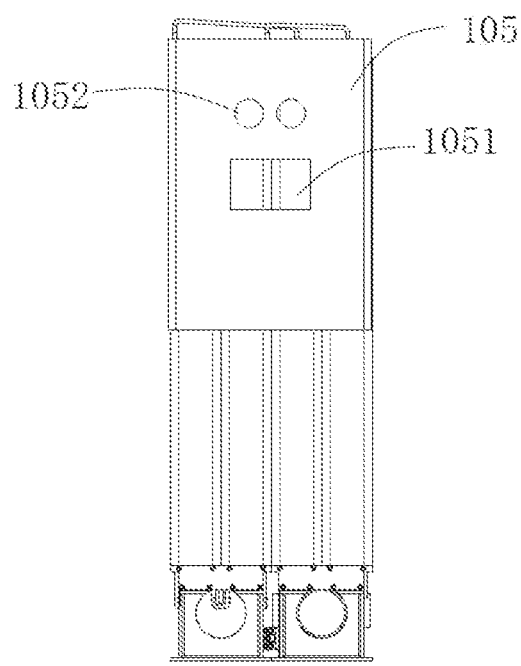
FIG. 6 is a structural view, seen as from the right side, of the drying and filtering device of the present disclosure in an embodiment.

As shown in FIG. 1 to FIG. 6, FIG. 1 is a schematic perspective view of the drying and filtering device of the present disclosure rotated at an angle in an embodiment, FIG. 2 is a schematic perspective view of the drying and filtering device of the present disclosure rotated at another angle in an embodiment, FIG. 3 is a structure view, seen as from the front side, of the drying and filtering device of the present disclosure in an embodiment, FIG. 4 is a structural view, seen as from the back side, of the drying and filtering device of the present disclosure in an embodiment, FIG. 5 is a structural view, seen as from the left side, of the drying and filtering device of the present disclosure in an embodiment, FIG. 6 is a structural diagram view, seen as from the right side, of the drying and filtering device of the present disclosure in an embodiment. The drying and filtering device 100 includes a bearing base 10, a refrigerating tube 20, an adsorption drying tube 30, a condensing tube 40, a refrigerant compressor 50, a refrigerant filter 60, a throttling device 70, an air inlet filter 81 and an air outlet filter 82 arranged on the bearing base 10.

The bearing base 10 includes a lower base 11 and an upper base 12. Two legs 13 are arranged below the lower base 11 to support the whole bearing base 10. The upper base 12 is located at the upper end of the bearing base 10, and the upper refrigerating airflow chamber 101 and the upper adsorbing airflow chamber 102 are arranged in the upper base 12. The upper refrigerating airflow chamber 101 and the upper adsorbing airflow chamber 102 are isolated from each other and both extend along the transverse direction of the bearing base 10. The lower base 11 is located at the lower end of the bearing base 10, and the lower refrigerating airflow chamber 103 and the lower adsorbing airflow chamber 104 are arranged therein. The lower refrigerating airflow chamber 103 and the lower adsorbing airflow chamber 104 are isolated from each other and extend along the transverse direction of the bearing base 10.

The upper base 12 and the lower base 11 may be constructed of a plurality of tube bodies arranged side by side, and an air flow chamber is formed inside each tube body. As shown in FIG. 1 and FIG. 2, the upper base 12 includes four tube bodies, i.e., two upper refrigerating airflow chambers 101 and two upper adsorbing airflow chambers 102; the lower base 11 includes four tube bodies, i.e., two lower refrigerating airflow chambers 103 and lower adsorbing airflow chambers 104. Herein, there is no restriction on the number of airflow chambers included in the upper base 12 and the lower base 11, which can be selected or changed according to the actual application.

In other embodiments, the bearing base can be a box-shaped housing. The refrigerating tube 20, the adsorption drying tube 30, the condensing tube 40, the refrigerant compressor 50, the refrigerant filter 60, the throttling device 70, the air inlet filter 81 and the air outlet filter 82 are wrapped in the housing. The upper adsorbing airflow chamber and the upper refrigerating airflow chamber are formed on the upper inner wall of the housing, and the lower adsorbing airflow chamber and the lower refrigerating airflow chamber are formed on the lower inner wall of the housing. The upper adsorbing airflow chamber 102, the upper refrigerating airflow chamber 101, the lower adsorbing airflow chamber 104 and the lower refrigerating airflow chamber 103 can be integrally molded with the side wall of the housing.

The right side of the bearing base 10 is provided with an electric control box 105 for controlling the refrigerant compressor 50 and various internal valves. The outer surface of the electric control box 105 is provided with a control panel 1051 and a refrigerant pressure gauge 1052. The control panel 1051 is configured to be set various parameters of the refrigerant compressor 50 and controlled the opening and closing of each valve. The refrigerant pressure gauge 1052 is configured to measure the refrigerant pressure.

Figure 7:
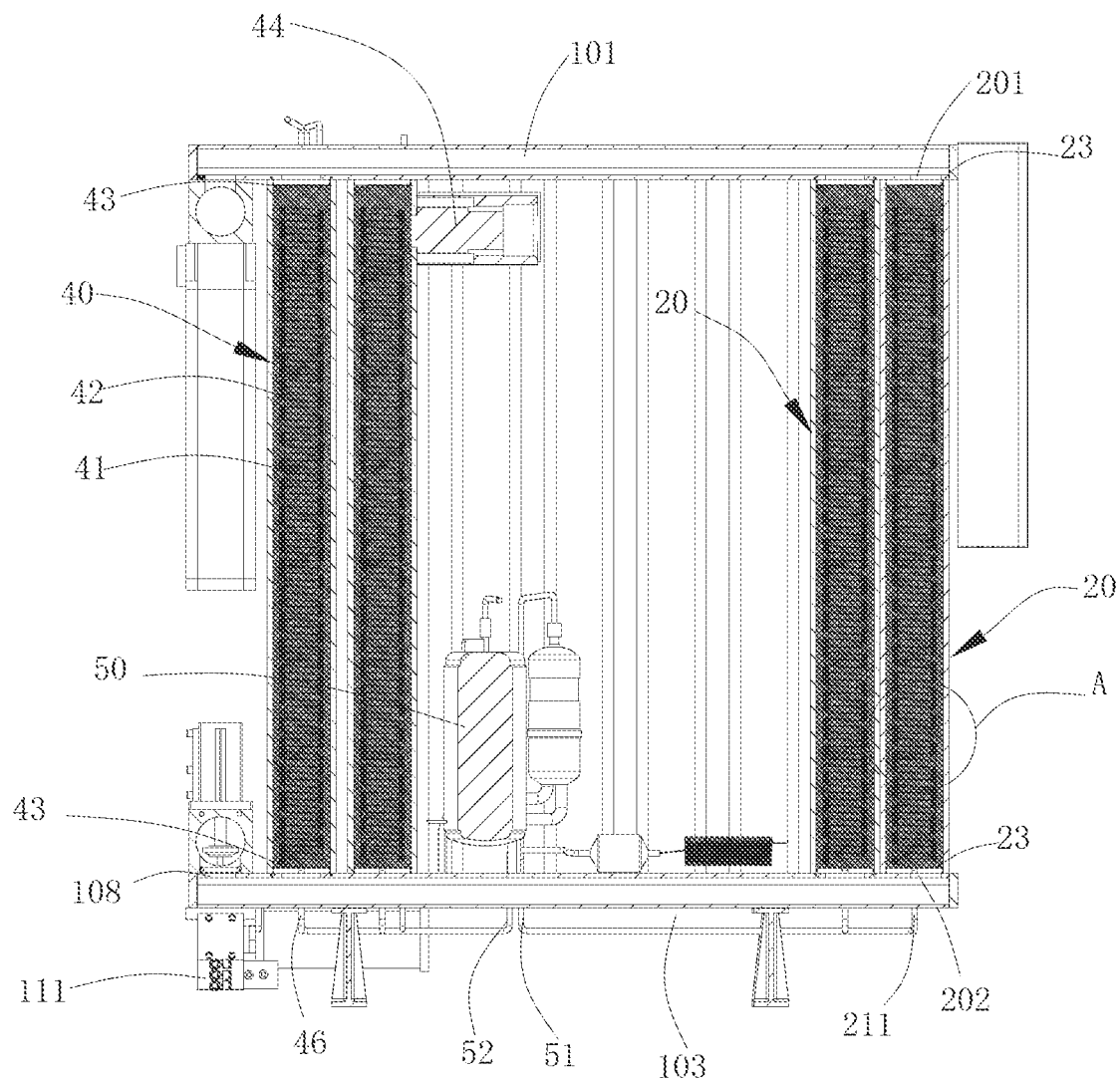
FIG. 7 is a front sectional view of the drying and filtering device of the present disclosure in an embodiment.
Figure 8:
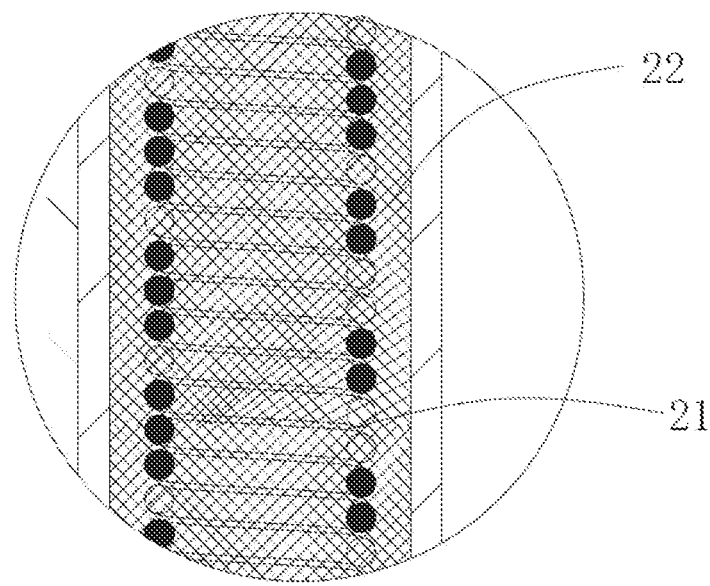
FIG. 8 is a partial enlargement view of the area A of FIG. 7.

As shown in FIG. 7 and FIG. 8, FIG. 7 is a front sectional view of the drying and filtering device of the present disclosure in an embodiment; FIG. 8 is a partial enlargement view of area A of FIG. 7; the refrigerating tube 20 is vertically arranged between the upper end and the lower end of the bearing base 10; more specifically, the refrigerating tube 20 is arranged between the upper refrigerating airflow chamber 101 and the lower refrigerating airflow chamber 103.

The bearing base 10 may include multiple rows of the upper refrigerating airflow chambers 101 and the lower refrigerating airflow chambers 103, and a refrigerating tube 20 is arranged between each row of the upper refrigerating airflow chamber 101 and the lower refrigerating airflow chamber 103.

The air inlet 201 of the refrigerating tube 20 is communicated with the upper refrigerating airflow chamber 101, and a sealing gasket is arranged at the air inlet 201 of the refrigerating tube 20 to ensure the sealing of the connection between the refrigerating tube 20 and the peripheral outer wall of the upper refrigerating airflow chamber 101. The air outlet 202 of the refrigerating tube 20 is communicated with the lower refrigerating airflow chamber 103, and a sealing gasket is arranged at the air outlet 202 of the refrigerating tube 20 to ensure the sealing of the connection between the refrigerating tube 20 and the peripheral outer wall of the lower refrigerating airflow chamber 103. The upper refrigerating airflow chamber 101 is communicated with the air inlet 106 of the bearing base 10. The lower refrigerating airflow chamber 103 is communicated with the intake guiding chamber 108, and according to FIG. 5, the intake guiding chamber 108 is arranged along the longitudinal direction of the bearing base 10, and the intake guiding chamber 108 is communicated with the adsorption drying tube 30. Through the intake guiding chamber 108 and the lower refrigerating airflow chamber 103, the airflow refrigerated by the refrigerating tube 20 flows out from the air outlet 202, flows into the adsorption drying tube 30 through the lower refrigerating airflow chamber 103 and the intake guiding chamber 108, and is adsorbed and dried by the adsorption drying tube 30.

A cooling thin tube 21 coiled into a spiral shape is arranged inside the refrigerating tube 20. The cooling thin tube 21 may be a copper tube, and the refrigerant circulates in the cooling thin tube 21. The cooling thin tube 21 is coiled from the upper end to the lower end of the refrigerating tube 20. The outer circumference of the cooling thin tube 21 is provided with a metal mesh 22. Furthermore, the metal mesh 22 is also arranged in the inner chamber formed when the cooling thin tube 21 is coiled into a spiral shape. The metal mesh 22 is closely contacted with the cooling thin tube 21.

When the airflow (compressed air) flows through the metal mesh 22, the metal mesh 22 has a certain blocking effect on the airflow, which slows down the velocity of the airflow, so that the airflow can contact with the cooling thin tube 21 much longer. Therefore the airflow can fully contact with the cooling thin tube 21, which can release a lot of heat, reduce the temperature of the airflow, and improve heat exchange efficiency. After the airflow cools down, a large amount of water condenses into water droplets and separated, and the condensed droplets are collected in the water storage chamber under the bearing base 10. A drain valve 111 is arranged in the water storage chamber. The drain valve 111 is regularly opened to drain the water out of the water storage chamber.

Two mesh plates 23 are further arranged inside the refrigerating tube 20, which are respectively arranged near the air inlet 201 and the air outlet 202 of the refrigerating tube 20. The mesh plate 23 can be a stainless steel mesh, whose cross-sectional size is approximately equal to the inner diameter area of the refrigerating tube 20, so that whatever the airflow enters or leaves the refrigerating tube 20, all passes through the mesh plate 23. The mesh size of the mesh plate 23 is smaller than that of the metal mesh 22, that is, the wire distribution density of the mesh plate 23 is higher than that of the metal mesh 22, so that the airflow entering or leaving the refrigerating tube 20 can be evenly distributed after passing through the mesh plate 23.

The liquid outlet port 211 of the cooling thin tube 21 is connected to the liquid inlet port 51 of the refrigerant compressor 50. The liquid outlet port 52 of the refrigerant compressor 50 is connected to the liquid inlet port 46 of the condensing thin tube 41 of the condensing tube 40. The refrigerant compressor 50 is configured to compress the refrigerant vaporized in the refrigerating tube 20 into the liquid refrigerant with high temperature and high pressure, and deliver to the condensing thin tube 41 of the condensing tube 40 for cooling.

The condensing tube 40 is vertically arranged between the upper end and the lower end of the bearing base 10. More specifically, both ends of the condensing tube 40 are respectively connected to the outer wall of the upper refrigerating airflow chamber 101 and the outer wall of the lower refrigerating airflow chamber 103. However, the openings at the upper end and lower end of the condensing tube 40 are isolated from the upper refrigerating airflow chamber 101 and the lower refrigerating airflow chamber 103 (i.e., not communicated). The condensing thin tube 41 may be a copper tube, which arranged in the condensing tube 40, and the condensing thin tube 41 is coiled in a spiral shape. The condensing thin tube 41 extends from the upper end of the condensing tube 40 to the lower end of the condensing tube 40. The outer circumference of the condensing thin tube 41 is filled with metal mesh 42. Furthermore, the condensing thin tube 41 can also be filled with the metal mesh 42 in an inner cavity formed when coiled in a spiral shape. The metal mesh 42 is closely contacted with the condensing thin tube 41.

The metal mesh 42 is arranged in the condensing tube 40 to increase the heat transfer area and improve the heat exchange efficiency. That is to say, when the airflow passes through the metal mesh 42, the metal mesh 42 has a certain blocking effect on the airflow, so that the flow velocity becomes slower when the airflow passes through the metal mesh 42, thereby making the airflow contact with the condensing thin tube 41 for a longer time. The airflow fully contacts with the condensing thin tube 41, and absorbs a large amount of heat of the refrigerant in the condensing thin tube 41, so as to rapidly reduce the temperature of the refrigerant.

Two mesh plates 43 are further arranged inside the condensing tube 40, which are respectively arranged near the openings at the upper end and lower end of the condensing tube 40. The mesh plate 43 may be a stainless steel mesh with a cross-sectional dimension approximately equal to the inner diameter area of the condensing tube 40, so that all of the heat exchanging medium (e.g., airflow) entering or leaving the condensing tube 40 passes through the mesh plate 43. The mesh size of the mesh plate 43 is smaller than that of the metal mesh 42, that is, the wire distribution density of the mesh plate 43 is higher than that of the metal mesh 42, so that the heat exchange medium entering or leaving the condensing tube 40 can be evenly distributed after passing through the mesh plate 43.

As shown in FIG. 2, the drying and filtering device 100 includes two groups of adsorption drying tubes 30 arranged side by side, and the two groups of adsorption drying tubes 30 alternately perform adsorption and regeneration work. For example, the first group performs the regeneration work, that is, the airflow purges the desiccant in the adsorption drying tube 30 from top to bottom to take away the moisture in the desiccant; the second group performs the adsorption drying work, and the desiccant absorbs the moisture in the airflows to dry the airflow. When the desiccant of the second group is close to saturation, the two groups switch working manners, that is, the first group performs the adsorption drying work, and the second group performs the regeneration work, so as to continuously obtain the dry gas.

It can be understood that the drying and filtering device 100 may also include more than two groups of the adsorption drying tubes 30. For example, three groups of the adsorption drying tubes can be included, one group for the regeneration work and the other two groups for the adsorption drying work.

Figure 9:
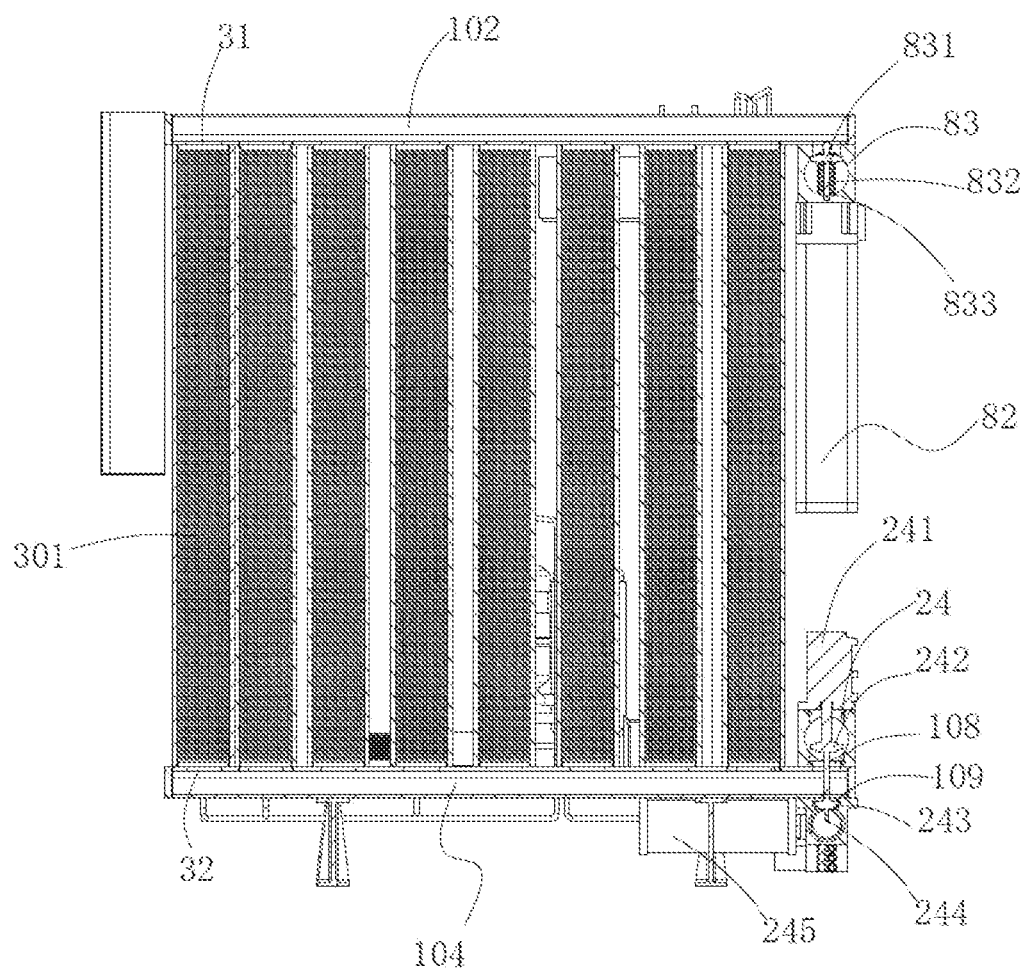
FIG. 9 is a back sectional view of the drying and filtering device of the present disclosure in one embodiment.

Further, as shown in FIG. 9, FIG. 9 is a back sectional view of the drying and filtering device of the present disclosure in one embodiment. The drying and filtering device 100 includes a plurality of groups of dry adsorption tubes, and each group includes a plurality of the adsorption drying tubes 30. The adsorption drying tubes of the same group are arranged vertically between the upper end and the lower end of the bearing base 10, more specifically, the plurality of the adsorption drying tubes 30 of the same group are arranged side by side between the upper adsorbing airflow chamber 102 and the lower adsorbing airflow chamber 104 of the same group. The interior of each adsorption drying tube 30 is filled with the desiccant. The upper end and the lower end of the adsorption drying tube 30 is respectively provided with an upper opening 31 and a lower opening 32. A sealing gasket is arranged around each one of the upper opening 31 and the lower opening 32 of the adsorption drying tube 30 to ensure that both ends of the adsorption drying tube 30 are closely connected to the outer wall of the upper adsorbing airflow chamber 102 and the outer wall of the lower adsorbing airflow chamber 104 to ensure the sealing property.

Figure 10:
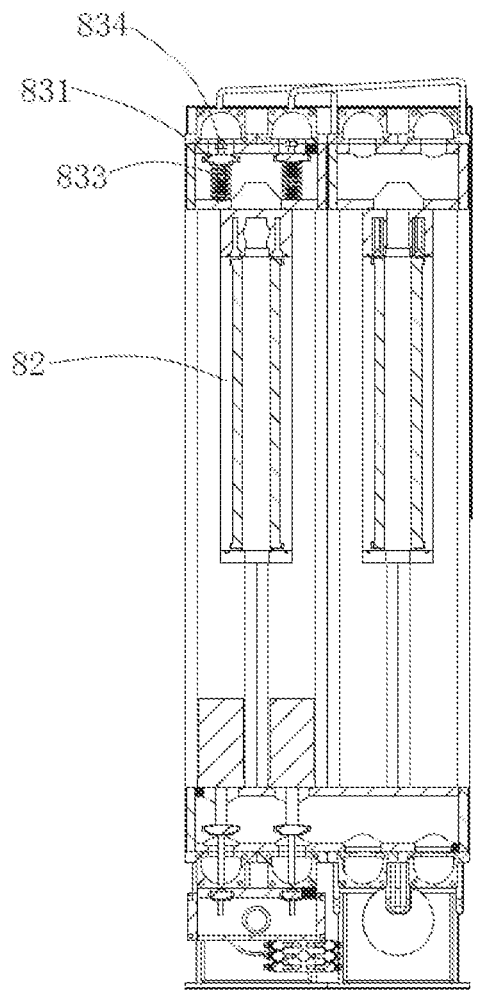
FIG. 10 is a left side sectional view of the drying and filtering device of the present disclosure in an embodiment.

The upper opening 31 is communicated to the upper adsorbing airflow chamber 102. As shown in FIG. 9 and FIG. 10, FIG. 10 is a left sectional view of the drying and filtering device of the present disclosure in an embodiment. A one-way outlet valve seat 83 is arranged at the connection between the upper adsorbing airflow chamber 102 and the air outlet filter 82, and a one-way sealing pressure plate 831, a pull rod 832 connected to the one-way sealing pressure plate 831 and a one-way spring 833 sleeved on the pull rod 832 are arranged on the one-way gas outlet valve seat 83. The pull rod 832 is arranged on the bearing base 10 through a one-way shaft 834. When the airflow pressure in the upper adsorbing airflow chamber 102 reaches a preset pressure value, the airflow overcomes the spring force of the one-way spring 833, pushes the one-way sealing pressure plate 831 to move in the direction of the air outlet filter 82. The one-way sealing pressure plate 831 is separated from the connecting port between the upper adsorbing airflow chamber 102 and the air outlet filter 82, and the upper adsorbing airflow chamber 102 and the air outlet filter 82 are communicated, so that the airflow in the upper adsorption airflow chamber 102 can enter the air outlet filter 82 for filtration, and finally flow to the gas-using end through the air outlet port 107.

The lower opening 32 is communicated with the lower adsorbing airflow chamber 104, an inlet valve seat 24 is arranged at the connection between the lower adsorbing airflow chamber 104 and the intake guiding chamber 108, and a cylinder 241 is disposed on the air inlet valve seat 24. The cylinder 241 is connected to a connecting rod 244. The cylinder 241 can drives connecting rod 244 to move up and down. An intake sealing plate 242 and an exhaust sealing plate 243 are arranged on the connecting rod 244 at intervals. The the intake sealing plate 242 are located at the outlet of the intake guiding chamber 108 close to the side of the adsorption drying tube 30. The intake sealing plate 242 is configured to seal the intake guiding chamber 108 and the exhaust sealing plate 243 is configured to seal the exhaust port 109. The exhaust port 109 is arranged at the end of the lower adsorbing airflow chamber 104, which is used to exhaust the purged regeneration airflow into the atmosphere. The intake sealing plate 242 and the exhaust sealing plate 243 move with the movement of connecting rod 244.

When the group of the adsorption drying tubes 30 is performing adsorption work, the cylinder 241 acts to push the intake sealing plate 242 and the exhaust sealing plate 243 to move upward. After moving for a certain distance, the intake sealing plate 242 is far away from the outlet of the intake guiding chamber 108, the intake guiding chamber 108 is communicated with the lower adsorbing airflow chamber 104, and the exhaust sealing plate 243 seals the exhaust port 109. The airflow refrigerated by the refrigerating tube 20 enters the lower adsorbing airflow chamber 104 through the intake guiding chamber 108, and then enters each drying adsorption tube 30 for adsorption and drying. The dried air flow is concentrated in the upper adsorbing air flow chamber 102, and when the air pressure in the upper adsorbing airflow chamber 102 reaches the preset value, the airflow overcomes the force of the one-way spring 833, pushes the one-way sealing pressure plate 831 to move downward, which allows the upper adsorbing airflow chamber 102 and the air outlet filter 83 to communicate, and enters the air outlet filter 82 for filtration, so as to be removed solid impurities such as oil and dust. Finally, the filtered airflow will flow to the external gas-using end through the air outlet port 107.

When the group of the adsorption drying tubes 30 performs the regeneration work, the cylinder 241 acts to push the intake sealing plate 242 and exhaust sealing plate 243 to move downward. After moving for a certain distance, the intake sealing plate 242 seals the intake guiding chamber 108, and the exhaust sealing plate 243 opens the exhaust port 109. The regeneration airflow flows out from one group of the adsorption drying tubes 30, and enters another group of the adsorption drying tubes 30 for purging and regenerating through the regenerating airflow pipe 401. The regeneration airflow blows the adsorbent from top to bottom to take away the moisture in the adsorbent, and the airflow with the moisture is finally discharged through the exhaust port 109. Furthermore, an exhaust muffler 245 is arranged near the exhaust port 109 to reduce the exhaust noise.

It should be noted that the regeneration airflow refers to the airflow that returns to another group of the adsorption drying tubes for purging and adsorbing after being adsorbed and dried by the adsorption drying tubes.

Figure 11:
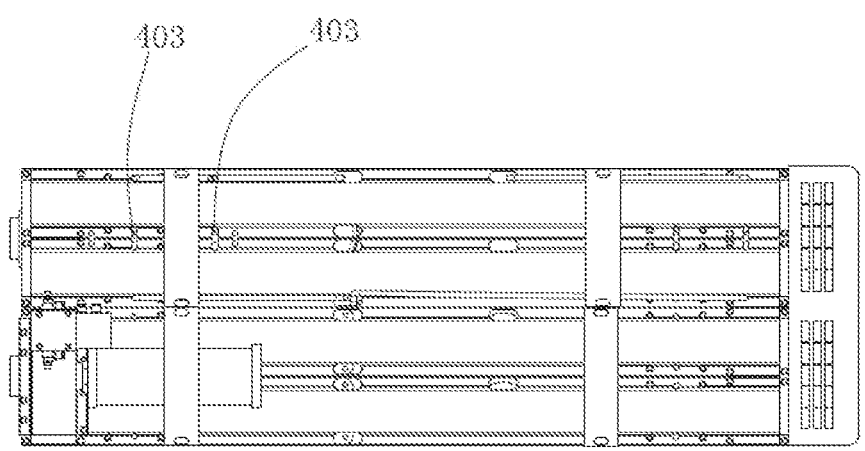
FIG. 11 is a bottom view of the drying and filtering device of the present disclosure in one embodiment.

As shown in FIG. 7 and FIG. 11, FIG. 11 is the bottom view of the drying and filtering device of the present disclosure in one embodiment, and there are two group of the condensing tube 40. It can be understood that the number of groups of condensing tubes 40 is not limited, which can be changed according to the actual situation. The upper end and the lower end of each condensing tube 40 are provided with openings for the heat exchange medium to pass through. The openings at the upper ends of one group of the condensing tubes 40 are communicated with one group of the adsorption drying tubes 30 through a regenerating airflow pipe 401. The openings at the upper ends of another group of the condensing tubes 40 are communicated with another group of the adsorption drying tubes 30 through another regenerating airflow pipe 401. The two groups of the condensing tubes 40 are communicated through the lower chamber pipe 403. Two regenerating airflow pipes 401 are both provided with a flow regulating valve (not shown), which is used to regulate the volume of the regeneration airflow flowing into the condensing tube 40. As mentioned above, two groups of the adsorption drying tubes 30 alternately perform the adsorption work and the regeneration work, that is, one group of the adsorption drying tubes is the adsorption group; the other group of the adsorption drying tubes is the regeneration group. Under the regulation of the flow regulating valve, part of the airflow after being adsorbed and dried by the adsorption drying tubes 30 of the adsorption group (i.e. the part of the airflow converging in the upper adsorbing airflow chamber) flows into a group of the condensing tubes 40 connected to the regenerating airflow pipe 401 through the regenerating airflow pipe 401, and performs heat exchange with the condensing thin tubes 41 in the group of the condensing tubes 40, and then the airflow enters the adjacent another group of the condensing tubes 40 through the lower chamber pipe 403 and perform heat absorption in the group of the condensing tubes 40. After heat absorption, the airflow converges in the upper adsorbing airflow chamber 102 corresponding to the another group of the condensing tubes 40, and then enters the adsorption drying tubes 30 of the regeneration group through another regenerating airflow pipe 401, and purges the desiccant of the adsorption drying tube 30 of the regeneration group from top to bottom to take away the moisture in the desiccant.

After dried by the adsorption drying tubes 30 of the adsorption group, most of the airflow enters the air outlet filter 82, and finally flows to the gas-using end through the air outlet port 107, and a small part of the airflow enters the condensing tube 40 through the regenerating airflow pipe 401 for heat exchange. Since the airflow is heated and then enters the regeneration group for purging, the efficiency of desorption can be improved. On the other hand, when the regeneration airflow is heated, the temperature of the refrigerant in the condensing thin tube 41 of the condensing tube 40 is reduced, which achieves the purpose of refrigerating the refrigerant. Therefore, to a certain extent, energy consumption is saved.

In other embodiments, a small part of the airflow after being dried by the adsorption drying tubes 30 of the adsorption group can directly enters the adsorption drying tubes 30 of the regeneration group through the regenerating airflow pipe for purging without entering the condensing tube for heat exchanging and heating.

In addition, a condensing fan 44 is arranged near the condensing tube 40, and the condensing fan 44 is configured to purge the condensing tube 40 to accelerate the decrease of the temperature of the refrigerant in the condensing tube 40.

In addition, except for the refrigeration by exchanging heat with the regeneration airflow, the refrigeration of the refrigerant by the condensing tube 40 can also be performed by cooling water. For example, the drying and filtering device includes multiple groups of condensing tubes, and the condensing thin tubes of multiple groups of condensing tubes can be communicated in parallel (that is, the liquid inlet port of each condensing tube is connected to the refrigerant compressor, and the refrigerant from the refrigerant compressor flows into each condensing tube). At least one group of condensing tubes is provided with cooling water, and the cooling water exchanges heat with the condensing thin tubes to cool the refrigerant in the condensing thin tubes, the condensing tubes that are not provided with the cooling water can be provided with the regeneration airflow for heat exchange. It can be understood that the condensing thin tubes of multiple groups of condensing tubes can also be communicated in series (the refrigerant from the refrigerant compressor enters into each condensing tube one by one). At least one group of condensing tubes is provided with cooling water, and the cooling water exchanges heat with the condensing thin tubes to cool the refrigerant in the condensing thin tubes. It can be understood that cooling water can be introduced into each group of condensing tubes to cool the refrigerant. When the condensing tube 40 is cooled by cooling water, the air inlet beside the condensing fan can be closed to avoid water flowing into the condensing fan.

The outlet end of the condensing thin tube 41 of the condensing tube 40 is connected to the refrigerant filter 60. The refrigerant filter 60 is fixed on the bearing base 10 and is configured to filter the impurities in the liquid refrigerant output from the condensing thin tube 41 of the condensing tube 40.

The throttling device 70 is arranged on the bearing base 10, which is communicated with the refrigerant filter 60, and is configured to decompress the low temperature and high pressure liquid refrigerant filtered by the refrigerant filter 60 into the low temperature and low pressure liquid refrigerant, and deliver the decompressed low temperature and low pressure liquid refrigerant to the cooling thin tube 21 in the refrigerating tube 20. The throttling device 70 may be an expansion valve or a capillary tube.

In the above embodiment, the metal meshes are arranged in both the condensing tube 40 and the refrigerating tube 20, but not limited to this. The metal meshes may not be arranged in the condensing tube 40 and the refrigerating tube 20.

In the above embodiment, the condensing tube 40 adopts a structure similar to the refrigerating tube 20 to cool the refrigerant, but is not limited to this. The condensing tube 40 can also adopt other structures, such as a traditional condensing tube structure with copper tubes and fins.

In the above embodiment, the refrigerating tube 20 performs heat exchange with the airflow (compressed air) through the refrigerant, so as to achieve the purpose of cooling the airflow. However, it is not limited to this, in other embodiments, the cooling water can be used to exchange heat with the airflow. Specifically, as shown in FIG. 2, the inlet end of the cooling thin tube 21 is communicated with the water inlet port 45 of the external cooling water, and the outlet end of the cooling thin tube 21 is communicated with the water outlet port. The cooling water provided into the cooling thin tube 21 exchanges heat with the airflow, and then is discharged from the drying and filtering device through the water outlet port. In addition, if the refrigerating tube 20 is not refrigerated by cooling water, the water inlet port 45 and the water outlet port should be closed.

Both the air inlet filter 81 and the air outlet filter 82 are provided with filter elements. The filter element can be PP cotton, which is used to filter solid impurities such as oil and dust.

In addition, it should be noted that the number of groups and the positions of the refrigerating tubes, the condensing tubes and the adsorption drying tubes are not limited to the above embodiment, and the number of groups and positions of the refrigerating tubes, the condensation tubes and the adsorption drying tubes can be changed and selected according to the actual application.

In summary, the drying and filtering device of the present disclosure integrates the refrigerating tube and the adsorption drying tube on the same bearing base, and the refrigerating tube and the adsorption drying tube are communicated through the intake guiding chamber, so that the airflow refrigerated by the refrigerating tube can enter the adsorption drying tube through the intake guiding chamber for being adsorbing and drying. In this way, the airflow (compressed air) is pre-cooled by the refrigerating tube first and then enters the adsorption drying tube. The adsorption drying efficiency is improved, the moisture in the compressed air can be fully removed to meet the use requirements of the compressed air, and the refrigerating tube and the adsorption drying tube are integrated together, which reduces the volume of the whole drying and filtering device, and is conducive to the miniaturization of the product.

In addition, the drying device includes at least two groups of adsorption drying tubes, each of which performs adsorption work and regeneration work alternately. Each adsorption drying tube is connected to the corresponding condensing tube through the regenerating airflow pipe, so that part of the airflow dried by the adsorption drying tube can enter the condensing tube through the corresponding regenerating airflow pipe for heat absorption, and then the airflow after heat absorption enters into the adsorption drying tubes of the regeneration group through another regenerating airflow pipe to purge the adsorbent therein. Since the heated airflow has stronger desorption ability to the adsorbent, the purging efficiency of the regeneration airflow is improved. On the other hand, when the regeneration airflow is heated, the temperature of the refrigerant in the condensing tube is reduced, and the energy consumption is saved.

The above are only preferred and feasible embodiments of the present invention and do not limit the scope of the present invention. All equivalent structural changes made by using the contents of the description and drawings of the present invention are included in the scope of the present invention.

What is claimed is:

1. A drying and filtering device, comprising:
   a bearing base comprising an upper adsorbing airflow chamber and an upper refrigerating airflow chamber located at the upper end of the bearing base and a lower adsorbing airflow chamber and a lower refrigerating airflow chamber located at the lower end of the bearing base;
   adsorption drying tubes vertically arranged between the upper end and the lower end of the bearing base, and communicated with the upper adsorbing airflow chamber and the lower adsorbing airflow chamber;
   a refrigerating tube vertically arranged between the upper end and the lower end of the bearing base, and communicated with the upper refrigerating airflow chamber and the lower refrigerating airflow chamber; and
   the bearing base body further comprising an intake guiding chamber, which is communicated with the refrigerating tube and the adsorption drying tubes, so that the airflow refrigerated by the refrigerating tube can enter the adsorption drying tube through the intake guiding chamber for drying.

2. The drying and filtering device according to claim 1, wherein the drying and filtering device comprises at least two groups of the adsorption drying tubes, each of which performs adsorption work and regeneration work alternately;
   wherein a group of adsorption drying tubes for adsorption work are communicated with the other group of adsorption drying tubes for regeneration work through a regenerating airflow pipe, so that a regeneration airflow from one group of adsorption drying tubes can enter the other group of adsorption drying tubes for adsorption work through the regenerating airflow pipe for purging and regenerating;

wherein the end of the lower adsorbing airflow chamber is provided with an exhaust port, which is configured to exhaust the purged regeneration airflow into the atmosphere.

3. The drying and filtering device according to claim 2, wherein an intake sealing plate is arranged at the outlet of the intake guiding chamber on the side close to the adsorption drying tube, and an exhaust sealing plate is arranged at the exhaust port; and when the adsorption drying tube performs regeneration work, the exhaust sealing plate is driven away from the exhaust port by a cylinder, and the intake sealing plate is driven by the cylinder to close the outlet of the intake guiding chamber, so that the regeneration airflow is discharged through the exhaust port.

4. The drying and filtering device according to claim 3, wherein the intake sealing plate and the exhaust sealing plate are connected by a connecting rod, which is connected to the cylinder and can move up and down under the drive of the cylinder to drive the intake sealing plate and the exhaust sealing plate to move.

5. The drying and filtering device according to claim 2, wherein the upper adsorbing airflow chamber, the upper refrigerating airflow chamber, the lower adsorbing airflow chamber and the lower refrigerating airflow chamber extend in the transverse direction of the bearing base, and the intake guiding chamber is located at the lower end of the bearing base and extends along the longitudinal direction of the bearing base.

6. The drying and filtering device according to claim 1, wherein the refrigerating tube is provided with a cooling thin tube coiled into a spiral shape, and the drying and filtering device further comprises:

a plurality of condensing tubes vertically arranged between the upper end and the lower end of the bearing base, the condensing tubes being provided with a condensing thin tubes coiled into a spiral shape, and the condensing tube isolated to the upper refrigerating airflow chamber and the lower refrigerating airflow chamber;

a refrigerant compressor fixed on the bearing base, a liquid inlet port of the refrigerant compressor connected to a liquid outlet port of the cooling thin tube of the refrigerating tube, and a liquid outlet port of the refrigerant compressor connected to a liquid inlet port of the condensing thin tube, and the refrigerant compressor configured to compress the refrigerant vaporized in the refrigerating tube into a high-temperature and high-pressure liquid refrigerant, and deliver to the condensing thin tube of the condensing tube;

a refrigerant filter connected to an outlet end of the condensing thin tube of the condensing tube and configured to filter impurities in the liquid refrigerant outputted from the condensing thin tube of the condensing tube; and a throttling device communicated with the refrigerant filter and configured to decompress the low-temperature and high-pressure liquid refrigerant filtered by the refrigerant filter into a low-temperature and low-pressure liquid refrigerant, and to deliver the decompressed low-temperature and low-pressure liquid refrigerant to the cooling thin tube in the refrigerating tube.

7. The drying and filtering device according to claim 6, wherein the drying and filtering device further comprises a condensing fan, which is arranged near the condensing tube and configured to cool the condensing tube;

wherein the drying and filtering device comprises at least two groups of the adsorption drying tubes, each group of the adsorption drying tubes alternately performs adsorption work and regeneration work, each group of the adsorption drying tubes is communicated with a corresponding condensing tube through a regenerating airflow pipe, part of the airflow dried by the adsorption drying tubes enters the condensing tube through the regenerating airflow pipe to absorb heat, and the airflow after heat absorption enters the adsorption drying tubes for the regeneration work through another regenerating airflow pipe to perform purging and desorption;

wherein a flow regulating valve is arranged on the regenerating airflow pipe, and configured to adjust the volume of the regeneration airflow flowing into the condensing tube.

8. The drying and filtering device according to claim 6, wherein the drying and filtering device comprises a plurality of groups of condensing tubes, condensing thin tubes of which are communicated in series or in parallel, at least one group of condensing tubes is fed with cooling water, and the cooling water exchanges heat with the condensing thin tube to cool refrigerant in the condensing thin tube.

9. The drying and filtering device according to claim 1, wherein the refrigerating tube is provided with a cooling thin tube coiled into a spiral shape, an inlet end of the cooling thin tube is communicated with a water inlet for external cooling water, and an outlet end of the cooling thin tube is communicated with a water outlet, through which the water flow heat-exchanged with the airflow in the refrigerating tube is discharged.

10. The drying and filtering device according to claim 1, wherein the drying and filtering device further comprises an air inlet filter and an air outlet filter respectively disposed on both sides of the bearing base;

wherein the air inlet filter is communicated with the upper refrigerating airflow chamber and an air inlet port of the drying and filtering device, so that the airflow after being filtered by the air inlet filter enters the refrigerating tube for refrigeration through the upper refrigerating airflow chamber;

wherein the air outlet filter is communicated with the upper adsorbing airflow chamber and an air outlet port of the drying and filtering device, so that the airflow flows to a gas-using end through the upper adsorbing airflow chamber and the air outlet port after being adsorbed and dried by the adsorption drying tube.

11. The drying and filtering device according to claim 10, wherein a one-way air outlet valve seat is arranged at the communication between the upper adsorbing airflow chamber and the air outlet filter, and a one-way sealing plate, a pull rod connected to the one-way sealing pressure plate and a one-way spring sleeved on the pull rod are arranged on the one-way air outlet valve seat, and when the airflow pressure in the upper adsorbing airflow chamber reaches a preset pressure value, overcomes the spring force of the one-way spring, pushes the one-way seal pressure plate to move in the direction of the air outlet filter and communicates the upper adsorbing airflow chamber and the air outlet filter.

12. The drying and filtering device according to claim 1, wherein the bearing base is a box-shaped housing, the upper adsorbing airflow chamber and the upper refrigerating airflow chamber are formed on the inner wall of the upper end of the housing, and the lower adsorbing airflow chamber and the lower refrigerating airflow chamber are formed on the inner wall of the lower end of the housing.

13. The drying and filtering device according to claim 1, wherein the upper refrigerating airflow chamber and the upper adsorbing airflow chamber are isolated from each other and the lower refrigerating airflow chamber and the lower adsorbing airflow chamber are isolated from each other.

14. The drying and filtering device according to claim 1, wherein the bearing base comprises a lower base and an upper base, wherein the upper refrigerating airflow chamber and the upper adsorbing airflow chamber are arranged in the upper base, and the lower refrigerating airflow chamber 103 and the lower adsorbing airflow chamber 104 are arranged in the lower base.

15. The drying and filtering device according to claim 14, wherein the upper base and the lower base are constructed of a plurality of tube bodies arranged side by side.

16. The drying and filtering device according to claim 1, wherein the refrigerating tube has an air inlet communicated with the upper refrigerating airflow chamber and an air outlet communicated with the lower refrigerating airflow chamber, wherein a sealing gasket is arranged at the air inlet to ensure the sealing of the connection between the refrigerating tube and the peripheral outer wall of the upper refrigerating airflow chamber, and a sealing gasket is arranged at the air outlet to ensure the sealing of the connection between the refrigerating tube and the peripheral outer wall of the lower refrigerating airflow chamber.

17. The drying and filtering device according to claim 9, wherein the outer circumference of the cooling thin tube is provided with a metal mesh, which is closely contacted with the cooling thin tube.

18. The drying and filtering device according to claim 9, wherein an inner chamber formed by the cooling thin tube coiled into a spiral shape is provided with a metal mesh.

19. The drying and filtering device according to claim 9, wherein the cooling thin tube is coiled from the upper end to the lower end of the refrigerating tube.

20. The drying and filtering device according to claim 1, wherein the adsorption drying tube has an upper opening at the upper end and a lower opening at the lower end, wherein a sealing gasket is arranged around each one of the upper opening and the lower opening to ensure that both ends of the adsorption drying tube are closely connected to the outer wall of the upper adsorbing airflow chamber and the outer wall of the lower adsorbing airflow chamber.

\* \* \* \* \*